March 13, 1956 S. P. KINNEY 2,738,178
GAS WASHER
Filed Jan. 11, 1951 2 Sheets-Sheet 1

INVENTOR.
SELWYNE P. KINNEY.
BY
*Christy, Parmelee & Strickland*
ATTORNEYS.

March 13, 1956
S. P. KINNEY
2,738,178
GAS WASHER
Filed Jan. 11, 1951
2 Sheets-Sheet 2
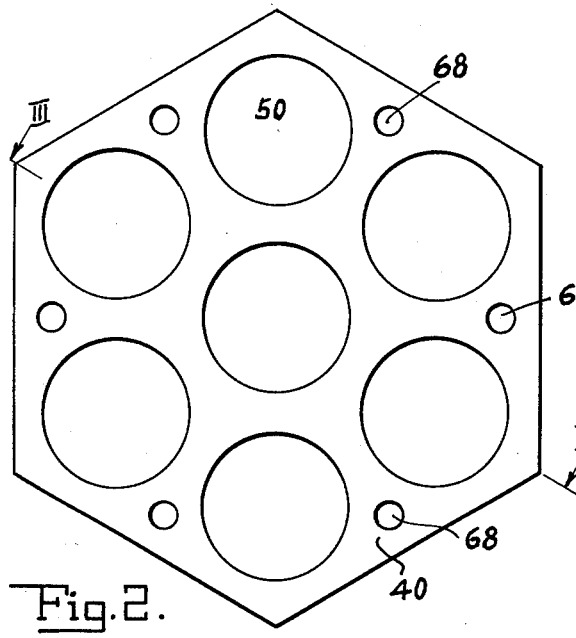
Fig.2.
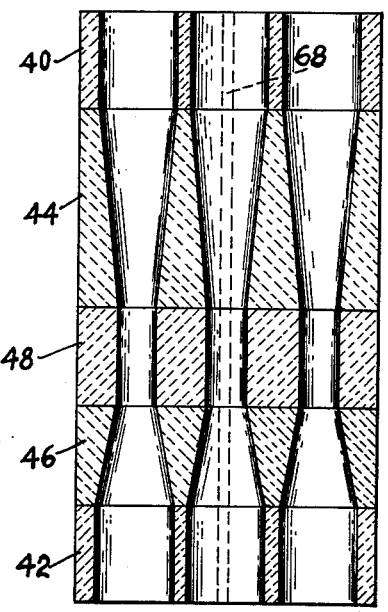
Fig.3.
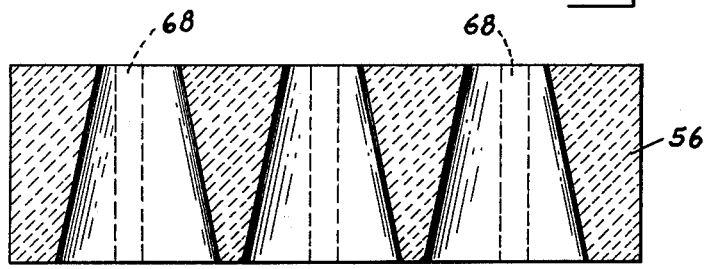
Fig.4.
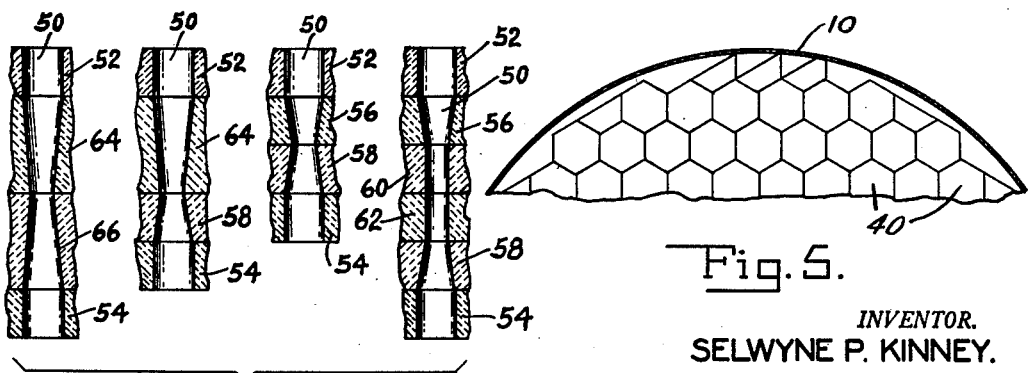
Fig.6.
Fig.5.
INVENTOR.
SELWYNE P. KINNEY.
BY Christy, Parmelee and Strickland
ATTORNEYS.

United States Patent Office 2,738,178
Patented Mar. 13, 1956

2,738,178

GAS WASHER

Selwyne P. Kinney, Crafton, Pa., assignor to S. P. Kinney Engineers, Inc., Carnegie, Pa., a corporation of Pennsylvania Application January 11, 1951, Serial No. 205,554

3 Claims. (Cl. 261—111)

This invention relates to gas washing. More particularly the invention relates to a primary washing of blast furnace gas with water for reducing the solids in the gas to one-quarter of a grain or less per cu. ft.

A combustible gas is made in the combustion zone of the iron blast furnace, which then passes through the bed of iron, coke and flux, and then through a dust collector before being washed to remove dust therein. Gas leaving the dust collector often has from 4.0 to 5.0 grains of dust per cu. ft. This gas has a heating value of 90 to 135 B. t. u. per cu. ft., and is therefore used as fuel for heating purposes. Dirty gas will clog the stoves and burners, so that good practice requires that the solids or dust be removed to less than 0.03 grain of dust per cu. ft. before the gas may be efficiently burned.

According to the present gas washing practice, the dirty gas from the dust collector containing from 4.0 to 5.0 grains per cu. ft. is passed through a primary washer to reduce the solids in the gas to 0.3 to 0.25 grain per cu. ft. The primary washed gas is then passed through a secondary washer or an electrical precipitator to reduce the solids to 0.03 to 0.015 grain or less per cu. ft. The tile washers commonly employed as primary washers remove much of the solids in the gas. To secure a good removal of solids with these washers, it is necessary to conduct the gas through small passageways in or between the tiles so that a drop of 12 to 14 inches of water pressure occurs in the gas passing through the washer. These higher pressure drops act to limit the washing capacity of the washer, and if such washers are operated with a lower pressure drop, then the removal of solids is substantially reduced.

The primary object of the present invention is to provide a gas washer in which the dust or solids in blast furnace gas may be effectively removed with a low drop in pressure of the gas passing through the washer.

Another object of the invention is to provide a method of and apparatus for washing gas by which an effective cleaning of the gas may be carried out with an apparatus having a high washing capacity.

A further object of the invention is to provide a gas washer in which a comparatively small amount of water is required to obtain a proper cleaning of the gas.

With these and other objects in view, the invention consists in the improved gas washing method and apparatus as hereinafter described, and particularly defined in the appended claims.

Various features of the invention are illustrated in the accompanying drawings, in which:

Fig. 2 is a top plan view of one of the tiles used in the gas washer shown in Fig. 1;

Fig. 3 is a vertical sectional view on a reduced scale, taken on the line III—III of Fig. 2, showing a series of tiles used for forming venturi throat passageways for washing gas;

Fig. 4 is a vertical section of a view of one of the tiles which is used for forming a venturi throat opening for the circulation of gas;

Fig. 5 is a partial plan view of a tile bed showing the way that the improved washing tiles are arranged within the washing tower shown in Fig. 1; and Fig. 6 is a diagrammatic view showing four different types of venturi throats that may be formed with different types of tiles that may be used in forming a tile bed.

Figure 1:
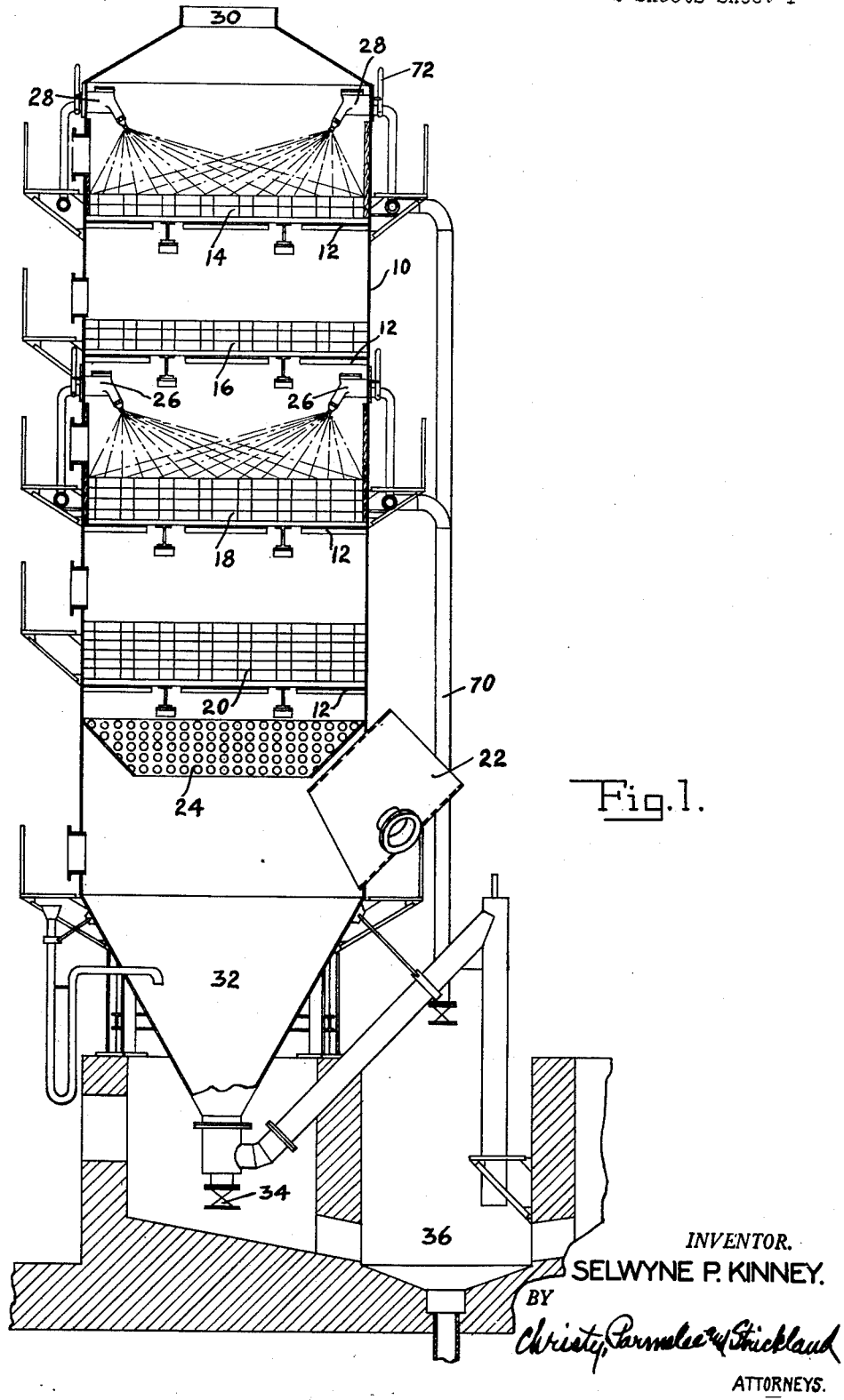
Fig. 1 is a vertical sectional view embodying a preferred form of apparatus in which to carry out the preferred method of washing gas.

The preferred form of apparatus for the primary washing of blast furnace gas is illustrated in Fig. 1, which consists of a vertical tower 10 having a series of metal open-mesh grates 12 positioned at different vertical levels in the tower, with tile beds 14, 16, 18 and 20 resting on the grates. The gas to be washed is introduced through a large inlet 22, and passes through a spray of liquid which falls from a perforated baffle 24. The gas after passing through and around the baffle, flows upwardly through a series of venturi throat openings which are formed in each of the beds 20, 18, 16 and 14. Water is introduced into the tower through spray nozzles 26 positioned immediately below the tile bed 16, and spray nozzles 28 positioned above the bed 14. Each of the spray nozzles projects a spray of water across the entire area of the tile beds 14 and 16, and the water then flows through the tile beds and drips from one tile bed to the next lower tile bed. The gas passing upwardly through the tower comes into contact with the water admitted through the spray nozzles and dripping from the bottom grate of each bed to wet the gas for the purpose of coagulating the dust therein, so that it may be separated from the gas. After the gas passes through the spray introduced by nozzles 28, it flows through an outlet 30 in a clean condition suitable for final washing. The wetting of the gas and the mixing of the gas in the venturi throats of the tile beds is very effective for separating dust and water from the gas.

The water loaded with dust as separated from the gas then works its way through the tile beds and across the baffle 20 into a collecting cone 32 from which the fouled water may be drawn off through a valve 34 into a sump 36.

The tiles used for washing the gas form an important feature of the present invention. These tiles are hexagonal in shape, as illustrated in Fig. 2, and each tile has seven openings for the purpose of forming the venturi throats for washing the gas. As illustrated in Fig. 3, a series of five tiles are used for making the venturi throats. Tiles 40 and 42 constitute the outlet and inlet tiles for the venturi throats, while tiles 44 and 46 contain frusto-conical openings arranged to form the contracting and expanding portions of the venturi throat. The central tile 48 is the contracted throat portion of the venturi throat. The openings in each of the tiles 40, 42, 44, 46 and 48 are arranged so that when the tiles are placed one above the other, all openings will be concentric and form a smooth venturi throat passageway. A well designed venturi throat passageway produces a comparatively small drop in pressure of gas passing through it. The pressure consumed in contracting the gas is recovered when the gas again expands, so that not more than 5 to 6% of the original pressure is lost.

Each tile bed extends across the entire area of the tower 10 and rests upon the grates 12. In Fig. 5 is illustrated the arrangement of the tiles so that the tiles extend entirely across the tower and force the gas to pass upwardly through the venturi throats in the tile in passing through the tower. It will be seen from Fig. 5 that the hexagonal tiles do not fit closely to the wall of the tower and the irregular spaces left with the tile arrangement is filled in with a refractory water-proof cement to entirely close off these irregular spaces.

It will be noted from Fig. 1 that the depth of the bed of tiles decreases in the direction of flow of gas. The tile bed 20 is made up of six tiles, the tile bed 18 being made up of four tiles, the tile bed 16 being made up of three tiles, and the tile bed 14 being made up of two tiles. The openings in the tiles for each bed are arranged so that venturi throat passageways are formed in each bed.

In the right-hand figure of Fig. 6 is shown a section of a tile bed having a venturi throat passageway 50 which is made up of six tiles. The top and bottom tiles 52 and 54 have the same shape and arrangement of openings. The intermediate tiles 56 and 58 are the tiles having the frusto-conical openings that form the expanding and contracting part of the passageway of the venturi throat. The tiles 60 and 62 form the central throat openings which register with the frusto-conical openings of the tiles 56 and 58. The left-hand figure of Fig. 6 illustrates a tile section having venturi throat passageways made up of four tiles, the top and bottom tiles 52 and 54 having the same shape and construction, and the central tiles 64 and 66 having frusto-conical openings. It will be noted that the central tiles 64 and 66 are thicker than tiles 56 and 58, and therefore have a longer frusto-conical opening than the tiles 56 and 58. Fig. 6 also illustrates two other forms of venturi throat passageways which are made up of different arrangements of tiles to give different forms of venturi throat passageways. From this description it will be seen that many different shapes of venturi throats may be made up with the use of four different designs of tile.

As an example of the types of tile bed combinations which may be used in a washing tower, the bed 20 may be composed of the six tile beds shown in Fig. 6, or the five tile beds shown in Fig. 3. The bed 18 may be made with either of the four tile beds shown in Fig. 6. The bed 16 may be made with the tile 46 at the bottom, the tile 48 in the center, and the tiles 64 or 56 at the top. Bed 16 also may be made with the tile 66 at the bottom, the tile 48 in the center, and the tile 64 at the top. The bed 14 may be made with the tiles 44 or 66 at the bottom, and the tiles 48 or 56 at the top.

The venturi throat passageways are very effective for mixing the gas with the water. As the gas enters the venturi throat passageway, it is contracted, and after passing the narrow portion of the throat, then expands. The alternate contraction and expansion allows the gas to pass through the passageways with comparatively small drop in pressure. The alternate contraction and expansion is, also, very effective in mixing the gas, water and dust, and in coalescing the water and dust particles. These coalesced materials drop out of the gas.

The purpose of having different lengths of venturi throat passageways in the tile beds is to provide a more effective washing and cleaning of the gas. By varying the venturi throat lengths, the mixing operation in each tile bed can be changed to obtain a very good cleaning operation. Each tile bed has a efficiency of mixing and coalescing the dust and water in the gas of approximately 80 to 90% of the solids and water which can be efficiently removed in a primary washer. For example the first tile bed may remove 85% of the solids and water to be removed by the primary washing. If the partially cleaned gas would then be put through a second tile bed having the same design and size of venturi throats, the solids and liquids removed in the second bed would be comparatively small. However, by changing the venturi throat design in the second tile bed a relatively higher separation of solids and water may be accomplished. For this reason the design and size of the venturi throats in the second, third and fourth tile beds are changed so as to remove the remaining 15% of solid of the primary washing. The throats are made shorter in the direction of the gas flow, and the pressure drop decreases as the venturi throats become shorter. With the four tile beds illustrated in the drawings, gas may be effectively washed to reduce the dust content below 0.25 grains per cu. ft. with a pressure drop of 6 inches of water when treating a gas originally containing 3 to 5 grains of dust per cu. ft. The low pressure drop allows the gas to be washed without requiring the use of a pump or blower, since the gas leaves the blast furnace with a pressure of 25 to 35 inches of water.

Referring to Figs. 2, 3 and 4, it will be noted that the hexagonal tile, in addition to having the large openings 50 for the venturi throat passageway, has a series of small openings 68, by which water which falls from the bottom of one tile bed may pass through the tile bed down to the next bed. A large portion of the water which is introduced by the spray will be taken up by the gas, and this water will generally be separated from the gas before the gas passes out of the top of the tower through the opening 30. The arrangement provides the movement of gas through water dripping from the tile beds and introduced through the spray to give an effective washing of the gas.

The spray nozzles 26 and 28 have a very important function in the present invention. Reference is made to my copending application Serial No. 129,083, filed November 23, 1949, now Patent No. 2,647,799 dated August 4, 1953, for a detailed description of the nozzle and its operating mechanism. Spray nozzles of this type may be effectively used for several years' continuous operation without becoming clogged. This is very important in a gas washing machine, because the blast furnaces generally operate continuously over a period of years, and it is important that the gas be continuously cleaned as it is produced. The water which is supplied to the nozzles passes through an inlet pipe 70 and may be taken from an outside source. Each of the spray nozzles is provided with a cleaning handle 72 which may be operated by hand, to place the spray-forming apparatus and the nozzle parts in a condition where a stream of water will flow through these parts to wash out any dirt that tends to cling to them. Therefore by drawing back the handle for a short period, the nozzles may be cleaned to allow an effective spray to be introduced into the tower.

Another important feature of the spray nozzle is that the supply pipes for the nozzle are large (usually four inches internal diameter) so that the liquid may pass through the piping without clogging the pipe. The volume of water supplied through the large pipe and through a large nozzle is such that fewer nozzles are required for supplying the water that is introduced over the entire area of a tile bed. This arrangement is much more effective than having a large number of smaller capacity nozzles that often become clogged. These nozzles use less water and can be operated with less expense of pumping water.

The preferred form of the invention having thus been described, what is claimed as new is:

1. Apparatus for washing dust laden gases, comprising a vertical tower, a gas inlet adjacent the bottom of the tower and a gas outlet adjacent the top thereof, tile supporting gratings positioned in a series of different levels within the tower between the inlet and outlet thereof, tile beds on each grating providing a plurality of elongated venturi passageways through which the gas flows during passage through the tower, each said successive bed of venturi passageways effecting a different compressive action on the gas flowing therethrough, means for introducing a water spray across the beds and wetting the gas before entering the beds, and means for collecting and withdrawing dust laden water from the tower.

2. Apparatus for washing dust laden gases, comprising a vertical tower through which the gasses are passed, vertically spaced gratings within the tower providing support for tile beds thereon, means for introducing a water spray across the beds and the gases flowing through the tower, and means for withdrawing dust laden water from the tower, said tile beds comprising closely fitting tiles stacked one above the other, each tile having a plurality of openings therethrough with the axes of the openings positioned so that when the tile are stacked the openings may be concentrically arranged, the openings of some tiles being frusto-conical and the openings in other tiles being cylindrical, said tiles and the openings therein being reversible by which the openings may be arranged to form venturi throat passageways in the stacked tiles.

3. The apparatus as claimed in claim 2 in which the individual tiles are made in two thicknesses, for tiles having different sizes of cylindrical openings therethrough, and two different shapes of frusto-conical openings therethrough, by which four different standard tiles may be stacked to concentrically arrange the openings to form venturi throat passageways of different lengths and designs in accordance with the number and arrangement of the tiles in a stack to form the bed.

References Cited in the file of this patent

UNITED STATES PATENTS

| Number | Name | Date |
|---|---|---|
| 1,173,187 | Hechenbleikner | Feb. 29, 1916 |
| 1,360,928 | Goodwin | Nov. 30, 1920 |
| 1,676,451 | Lilge | July 10, 1928 |
| 2,039,540 | Seaver et al. | May 5, 1936 |
| 2,234,385 | Ryner | Mar. 11, 1941 |
| 2,523,126 | Long | Sept. 19, 1950 |
| 2,542,681 | Kinney et al. | Feb. 20, 1951 |
| 2,608,398 | Park et al. | Aug. 26, 1952 |

FOREIGN PATENTS

| Number | Country | Date |
|---|---|---|
| 15,291 | Great Britain | June 30, 1911 |
| 421,905 | France | Mar. 8, 1911 |